US005125302A

United States Patent [19]

Biagiotti

[11] Patent Number: 5,125,302

[45] Date of Patent: Jun. 30, 1992

[54] PERFORATING APPARATUS FOR TRANSVERSE PERFORATIONS IN WEBS OF PAPER-LIKE MATERIAL

[75] Inventor: Guglielmo Biagiotti, Capannori, Italy

[73] Assignee: Fabio Perini S.p.A., Lucca, Italy

[21] Appl. No.: 630,805

[22] Filed: Dec. 24, 1990

Related U.S. Application Data

[63] Continuation of Ser. No. 474,893, Feb. 5, 1990, abandoned.

[30] Foreign Application Priority Data

Feb. 7, 1989 [IT] Italy ................................ 9331 A/89

[51] Int. Cl.[5] ......................... B23D 25/06; B26D 1/62

[52] U.S. Cl. ....................................... 83/62.1; 83/342; 83/343; 83/371; 83/672; 83/699

[58] Field of Search ................................ 83/340-343, 83/695, 696, 698, 699, 600, 605, 611, 371, 672, 62, 62.1

[56] References Cited

U.S. PATENT DOCUMENTS 3,190,163 6/1965 Bradley ................................ 83/342
3,264,921 8/1966 Nystrand .............................. 83/342
3,750,510 8/1973 Gabriels ........................... 83/341 X
3,935,774 2/1976 Craddy ............................ 83/699 X
4,782,678 11/1988 Reimschissel ..................... 83/371 X
4,813,320 3/1989 Malloy et al. ...................... 83/62 X

*Primary Examiner*—Mark Rosenbaum
*Assistant Examiner*—Kenneth E. Peterson
*Attorney, Agent, or Firm*—Francis J. Bouda

[57] ABSTRACT

A machine is described for perforating webs of material, such as toilet paper. The machine includes a cylinder (17) mounted on the frame of the machine and around which cylinder the web is carried as the web passes through the machine. The cylinder has a plurality of blades, one edge of each extending beyond the surface of the cylinder and parallel to the axis of the cylinder. A support (21) for a cooperating blade (33) is pivotally mounted on the machine in a manner which permits the cooperating blade (33) to move toward and away from the blades in the cylinder (17). The cooperating blade (33) extends at an angle to the axis of the cylinder and consists of a plurality of segments, each of which is supported in a block (25) which fits into seats in the support. The seats extend in a line parallel to the cylinder axis.

10 Claims, 5 Drawing Sheets

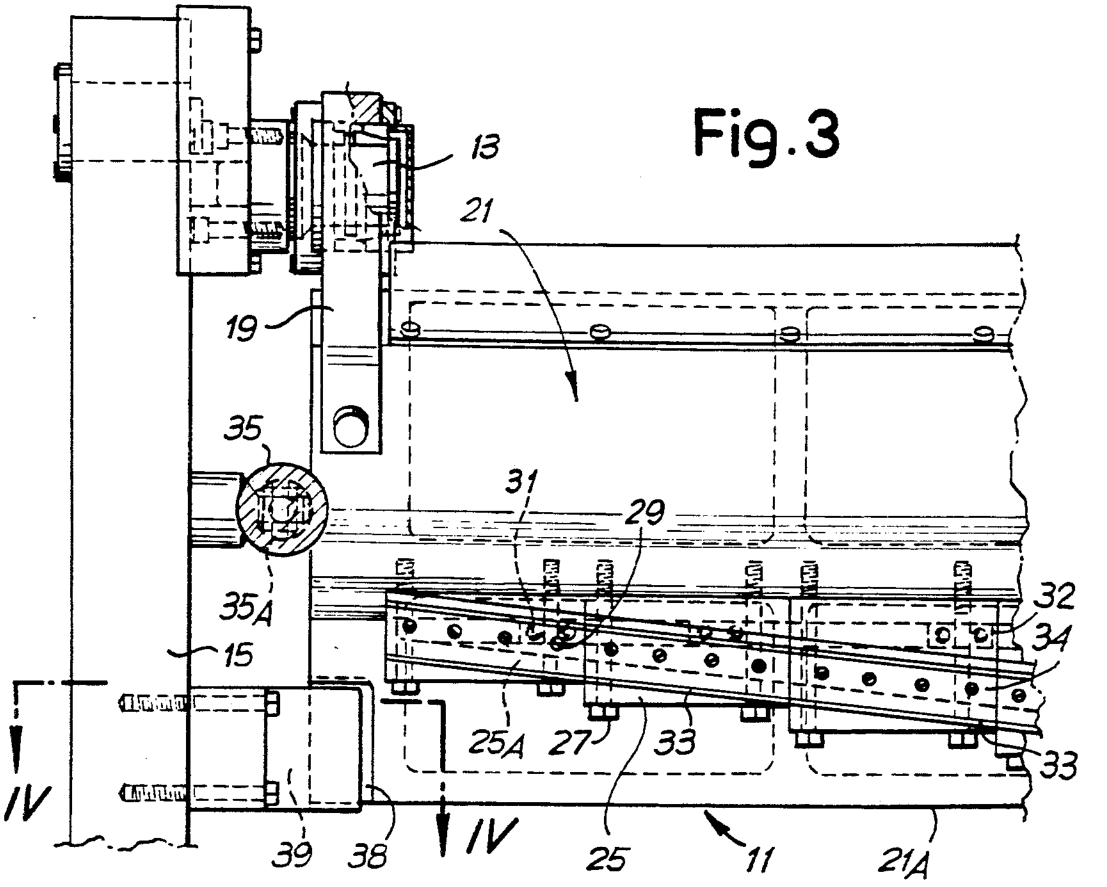
Fig. 3
Fig. 4
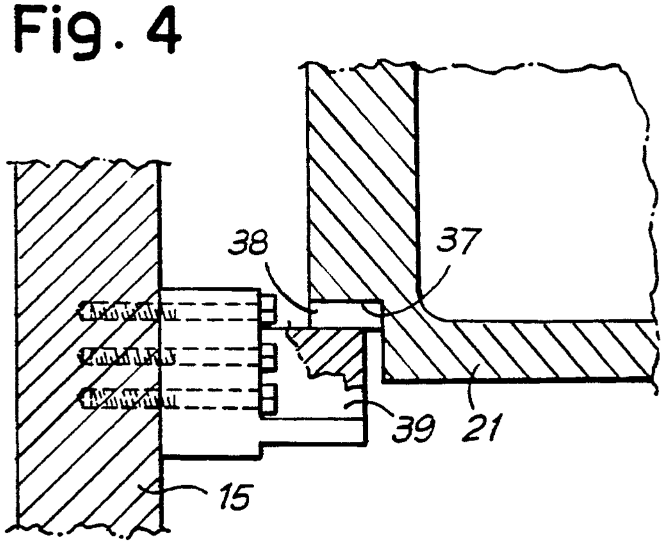

PERFORATING APPARATUS FOR TRANSVERSE PERFORATIONS IN WEBS OF PAPER-LIKE MATERIAL

This application is a continuation of application Ser. No. 07/474,893, filed Feb. 5, 1990, now abandoned.

BACKGROUND OF THE INVENTION

The invention refers to a perforating apparatus for transverse perforations in web material during the feeding thereof to a converting machine, for example, for the production of rolls of toilet paper and the like. Apparatus for this purpose comprises both a rotating roller, which carries a plurality of peripheral blades parallel to the roller axis and on which the web to be perforated is fed, as well as a non-rotating unit provided with oscillating motion, which is moved close to the roller and which carries inclined-blade means able to cooperate with the blades of the roller to carry out the transverse perforations. In the prior devices, said blade means have been made of a single blade, at high cost, of difficult assembly and registration, and expensive to operate, as it requires replacement on the occurrence of the slightest flaw.

An object of the invention is to provide a blade-cutting means which is less costly, of easier assembly, more easily adjustable and also capable of being replaced with less difficulty in case of localized damages or wear.

These and further objects and advantages will be evident by a reading of the following description.

SUMMARY OF THE INVENTION

According to the present invention, said inclined-blade means are made up of a plurality of adjacent blade segments carried by respective supporting blocks able to be received within seats formed in the non-rotating unit and each of which extends parallel to the roller axis. Each supporting block is adjustable in position within the seat for its adjustment with respect to the blades of the blade roller.

Preferably, the blade segments are disposed to form at least two adjacent helixes having same or opposite directions.

Advantageously, the blocks may be received within a seat formed by a beam of the oscillating unit or by shims engaged therein.

The seats for the support blocks may be formed by a step in the beam which is carried by oscillating arms making part of the same unit and by blocks, i.e., shims mounted against said step.

On each support block is mounted a blade segment with general disposition over at least two helixes having same or opposite directions. As an alternative, on each supporting block there may be mounted two or more blade segments having the cutting edge approximately parallel to the axis of the blade roller, and the various segments are generally arranged according to at least two helical bands having same or opposite directions.

Preferably, the movable unit of the segmented blade is urged by gravity against abutments which define its active position as the unit is movable like a pendulum. Sensor means may be provided to move said unit swiftly away from the blade roller if irregularities are detected by the sensor (i.e., vibrations or the like).

The blade roller may have grooves, i.e., discharge recesses, between the blades, on each of which a tooth projects and which can engage and discharge material which may be accidentally accumulated during operation.

The blades of the blade roller are mounted by clamping them, remotely from the active edge, by means of a heel of the blade-retaining blocks or bars and by rubber shims. Said rubber shims and a possible further dampening shim ensure reduction of the contact noise and allow limited resilient yielding of the free portion of the blades as far as to the bottom of the seat. This makes assembly and adjustment of the blades easy.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

FIG. 1 shows a vertical transverse section of the perforating apparatus of the present invention.

FIG. 1*a* illustrates a perspective view of a roll of toilet paper showing the perforations which are referred to in the present application.

FIG. 3 shows a partial view taken on line III—III of FIG. 1;

FIG. 4 is a local section taken on line IV—IV of FIG. 3;

Figure 1:
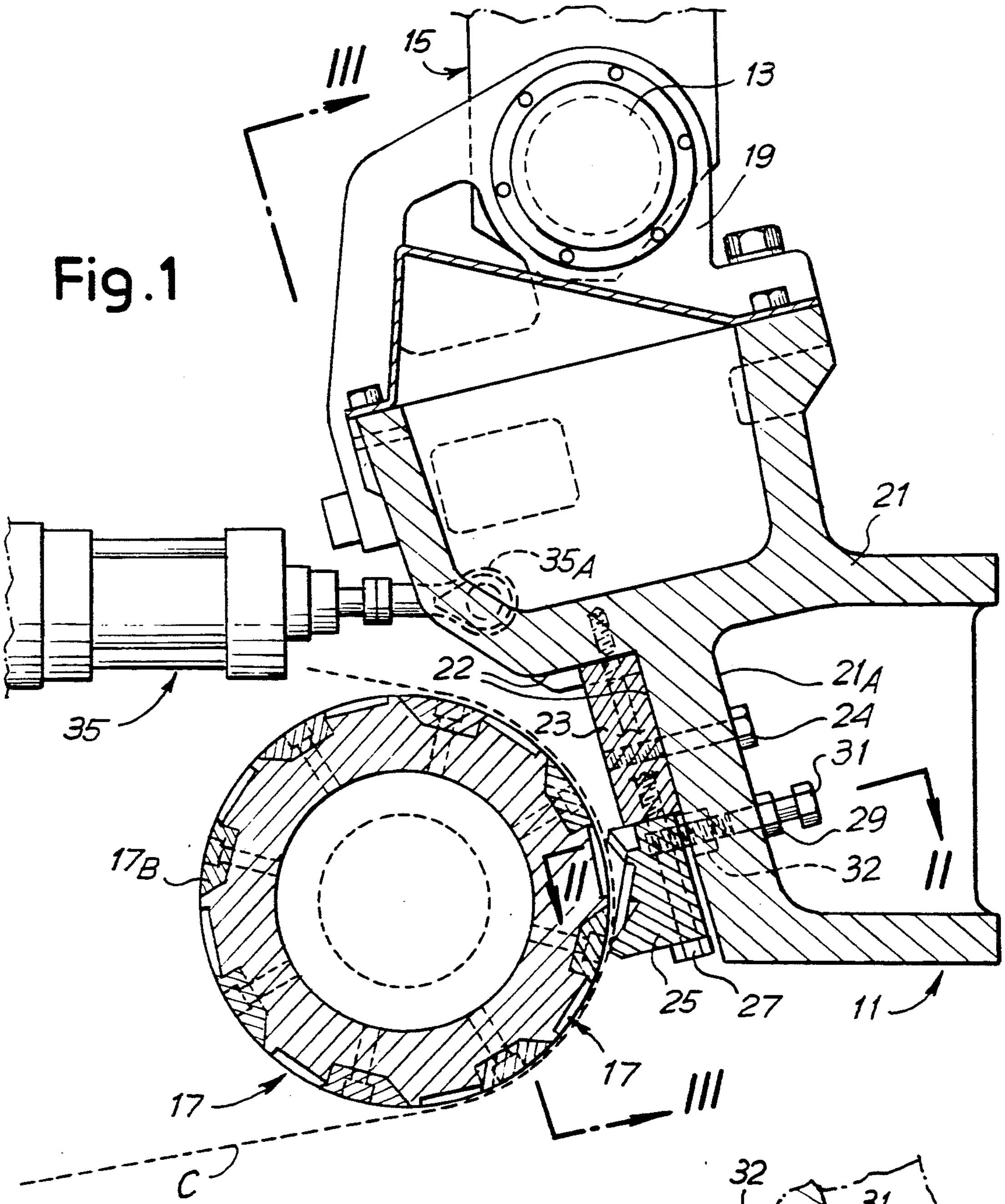
Figure 2:
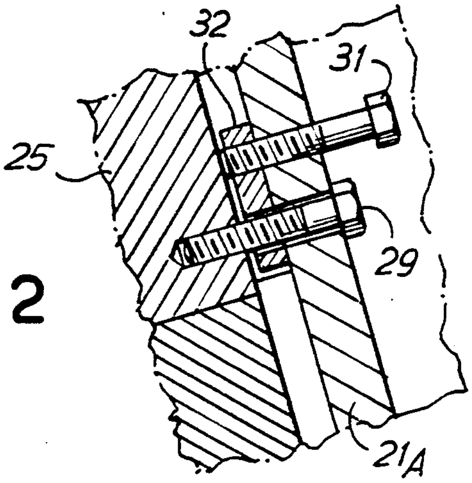
FIG. 2 shows a local section taken on line II—II of FIG. 1.
Figure 1A:
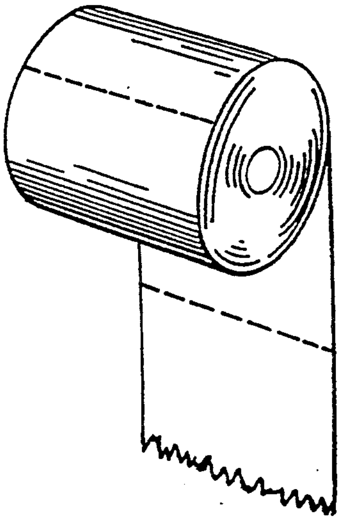

Referring now to the drawings, there is provided an oscillating unit 11 pivotally mounted at 13 to a fixed structure or frame 15 which is a part of the paper converting machine. The blade roller 17, provided with discharge grooves 17Y, is also mounted on the frame.

The oscillating unit 11 comprises a pair of arms 19, to which a transverse beam 21 is secured parallel to blade roller 17. The oscillating unit can be moved to and from the blade roller in order to render operative or inoperative the blade interaction for the formation of the transverse perforations or cuts.

Figure 5:
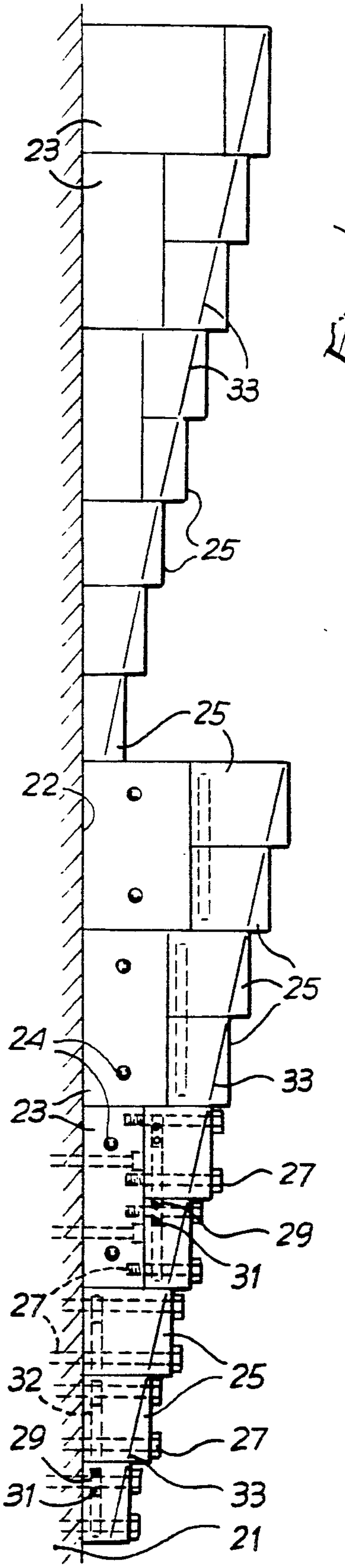
FIG. 5 is a fragmentary assembly scheme of the sectors of blades.
Figure 6:
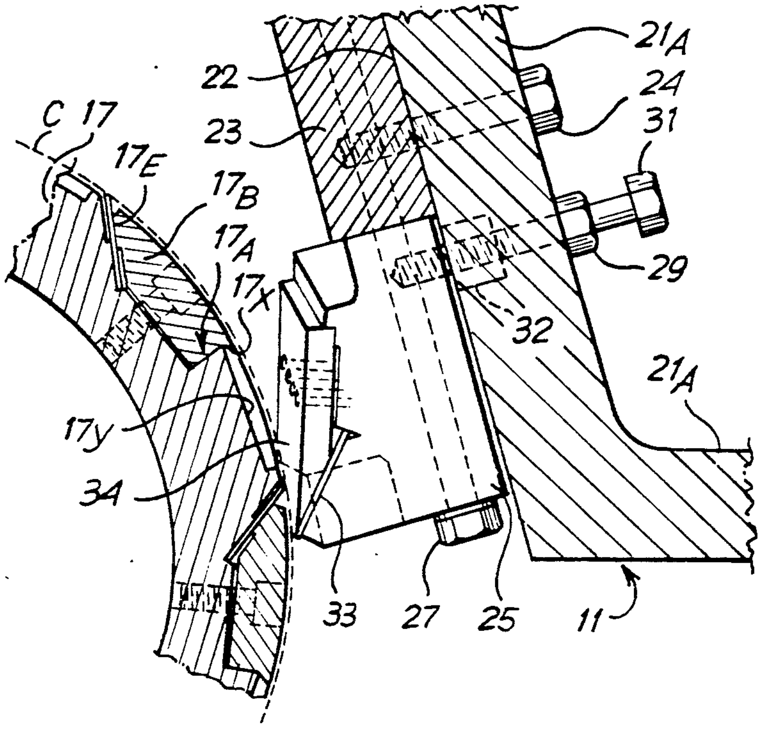
FIG. 6 is an enlarged detail of FIG. 1.

Beam 21 is particularly rigid and has a lower portion 21A defining a step-like seat 22. Within said seat, shims 23 of various dimensions can be disposed, fixed by screws 24, which, in turn, define step-like seats according to a suitable stair-wise arrangement (see FIG. 5). Seat 22 and the seats formed with the aid of shims 23 receive a plurality of blade supporting blocks 25 of limited length and different dimensions, disposed in two series on the portion 21A of the beam 21.

With an operating face-length in the order of magnitude of 250–350 cm, each blade supporting block 25 may have a length, for example, in the order of 20 cm. Each blade supporting block 25 can be held within its step-like seat by means of screws 27 which cross each block 25 from below to each seat 22 or shim 23. Each shim 23 is, in turn, fixed in the seat by screws which cross it. Each block 25 is further fixed by screws 29 which cross portion 21A. The positioning in an approximately horizontal direction (that is, in the direction of the blade roller) of the blocks is obtained by set screws 31 which engage keys 32 interposed between beam 21, 21A and blocks 25. Screws 31 form adjustable supports for blocks 25.

Figure 7:
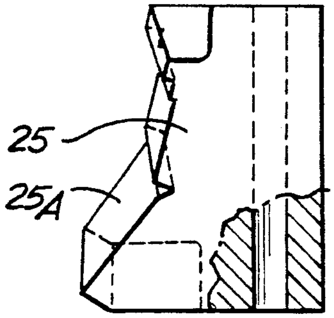
FIG. 7 shows a perspective view of one of the blade supporting blocks.
Figure 8:
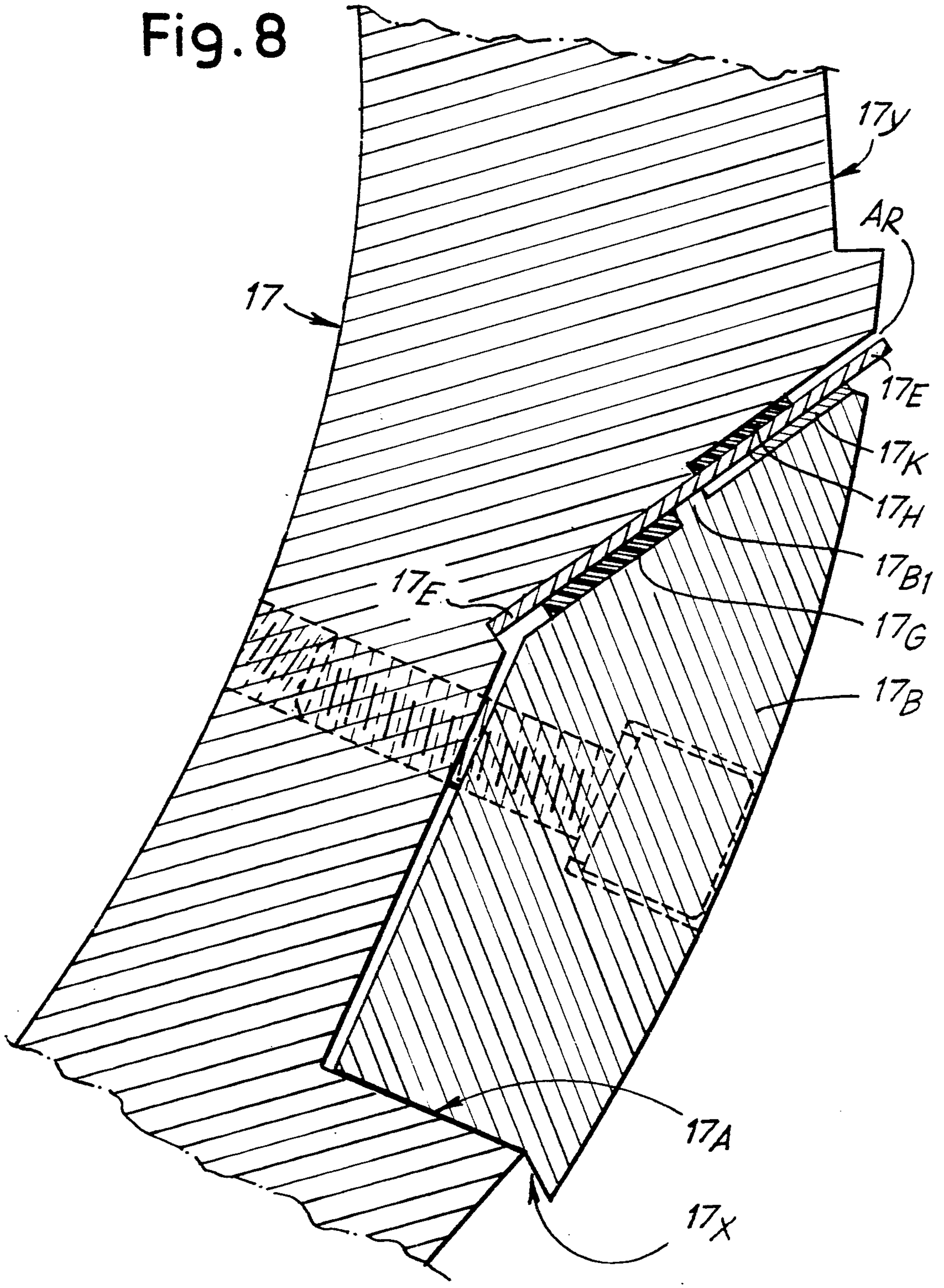
FIG. 8 shows a fragmentary detailed assembly of one blade of the rotating roller.

As shown clearly in FIG. 7, each block 25 has a cradle, i.e., an inclined surface 25A, which in practice has a helicoidal development to receive a blade segment 33 whose active edge, projecting from inclined surface 25A, extends over a cylindrical surface with axis parallel and coincident with that of blade roller 17. The successive blade supporting blocks 25, which are fitted into seat 22 and into the seats formed by shims 23, are provided with a inclined surface 25A of their own for a blade segment 33.

Blade segments 33 have all their active edge located along the above mentioned cylindrical surface to cooperate with the blades of blade roller 17. The blade segments 33 are fixed by shaped bars 34. The active edges of blade segments 33 extend longitudinally for a length corresponding to the axial extension of blade roller 17. The whole cutting edge formed by blade segments 33 is subdivided into two or more helicoidal sections, which may be of different lengths.

Accordingly, in the transverse dirèction, i.e., in the direction of the tangential movement of blade roller 17, the overall dimensions of the active edges of blade segments 33 are limited, although the cutting edges of blade segments 33 are quite inclined. Thereby the tangent overall dimensions of the active edges of the blades are limited with respect to those of the traditional single blade disposed over the whole work front.

This provides a cut which is far more regular and without the vibrations which take place when a single blade is used. Alternatively, the various blade segments 33 or segments of shorter length may be disposed, along each of the two or more helicoidal developments, all parallel one to the other and parallel to the axis of the blade roller, but being offset so as to define a helicoidal development.

Each blade segment 33 is not expensive, and can be fitted by very simple adjustment. In fact, each single blade segment is mounted o blocks 25 prior to being fitted into the machine, and blocks 25 are subsequently fitted into the relevant step-like seats of the oscillating unit of the machine quickly and easily.

The overall dimensions of the oscillating unit and of the active front of the blades of the oscillating unit are relatively limited in the tangential direction. The low cost of the blades results from the reduced dimension of the segments. The whole apparatus is far easier to run and the costs for maintenance and replacement are limited. The blade segments can be easily and readily adjusted on the blocks, and these can be easily adjusted on the oscillating unit. All the adjustment operations are much more simple than in prior art machines.

Oscillating unit 19, 21 may be moved to and from blade roller 17 by a control system such as cylinder-piston system 35 (either hydraulic or pneumatic) which is pivotally mounted on the frame 15 and connected to the oscillating unit at 35A. The oscillating unit is moved up to a position close to blade roller 17 by a pair of pawls and abutments provided at the two ends of beam 21. In particular, at the ends of beam 21 there are provided two pawls 37 which receive shims 38. Each of these pawls 37, 38 cooperates with a respective abutment formed by a block 39 facing the respective pawl 37, 38 and mounted on the frame 15. Adjustment may be provided to blocks 39 or shims 38. Unit 19, 21 must be so disposed as to automatically hang and in vertical position like a pendulum, so that, in an emergency, the whole may be readily removed, as it is only partially influenced by its own weight, and the only force to be overcome, by means, for example, of the sensor-controlled cylinder-piston system 35, is the force of inertia.

Blade roller 17 includes a plurality of seats 17A for blade-retaining blocks or bars 17B. Blocks 17B may have a tooth-like edge 17X, so as to grip any paper which may accumulate between roller 17 and unit 19, 21, in order to move it forward through grooves 17Y. This prevents an increase in bulk breaking of the blades. Bars 17B engage blades 17E, which may be in a single piece and parallel to the axis of the blade roller.

Behind the blades in the direction of the paper advancement, discharge grooves 17Y are intended to ease the discharge of possible lumps of paper and protect the blades. The edges of blades 17E project slightly beyond the periphery of blade roller 17. The seat is shaped so that there-below is formed an interspace AR whose height is sufficient to allow the blade to bend up to abutment before a displacement is reached which leads to a permanent deformation of the blade.

Blades 17E are mounted with the aid of rubber strips 17G, 17H and also by the clamping effect obtained through a heel 17B1. The rubber strips increase the blade mobility and thus the tolerance required for said blade (less precise blades can thus be used). At the same time, they contribute in reducing the noise caused by blade-to-counterblade contact, thereby obtaining the dampening of possible vibrations. A further dampening shim 17K may be provided toward the active end of the blade.

This flexible assembly may also be adopted on unit 19, 21.

The web C, driven around the blade roller, may be cut by the blades formed by blade segments 33 of the oscillating unit which is brought closer thereto. The contact of the front of segments of blades 33 is gradual on each one of blades 17E of the blade roller and thus the cut is particularly smooth and safe, and no vibrations take place nor other drawbacks occur in the perforation operations.

As an alternative design, the edge of one of the cooperating blades may be serrated or "saw-tooth".

It is to be understood that the present invention may be embodied in other specific forms without departing from the spirit or special attributes hereof, and it is therefore desired that the present embodiments be considered in all respects as illustrative, and therefore not restrictive, reference being made to the appended claims rather than to the foregoing description to indicate the scope of the invention. For example, blades and blade segments like those indicated by SS, may be arranged over two or more adjacent helixes having opposite directions instead of the same direction, as shown in dashed line in FIG. 5 for blade S3A which have an opposite direction with respect to blade SS in the same figure.

Having thus described my invention, what I claim as new and desire to protect by Letters Patent are the following:

1. A perforating apparatus for transverse perforations in web-like material during feeding thereof to a converting machine for the production of rolls of toilet paper and the like, said apparatus comprising:

a rotating cylinder on which the web to be perforated is driven, a plurality of peripheral blades carried by the cylinder parallel to the rotational axis of the cylinder, a movable support arranged to hang close to the cylinder, inclined blade means carried by said support so as to cooperate with the blades of the cylinder, said inclined blade means consisting of a plurality of adjacent blade segments (33) each having a straight cutting edge and all arranged to form a continuous, true helicoidal line when carried by respective supporting blocks (25), each having a base, said inclined blade means consisting of a plurality of blocks each block having a helicoidally curved cradle, a shaped bar, and a blade segment having a straight edge, said blade segment clamped between the cradle and the bar so that the straight edge of the blade bends and thus assumes a helicoidal curve, said blocks being received within seats (22) and (23) in said support (11, 19, 21), said bases of said blocks extending parallel to the axis of the cylinder (17).

2. The apparatus according to claim 1 characterized in that each supporting block (25) is individually adjustable within its seat with respect to the cylinder blades (17E) and the cylinder (17).

3. The apparatus of claim 2 wherein the adjustment of the blocks is by means of shims (23).

4. The apparatus according to claim 1 characterized in that the blocks (25) are each received in a seat (22) formed in the movable support (21).

5. The apparatus according to any one of the preceding claims 1–4 characterized in that the seats for the supporting blocks (25) are formed by steps (22) in the movable support (21).

6. The apparatus according to any one of the preceding claims 1–4 characterized in that on each supporting block (25) a blade segment (33) is helically mounted to form part of one of two or more adjacent helixes having same or opposite directions.

7. The apparatus according to any one of the preceding claims 1–4 characterized in that the cylinder blade (17E) of the cylinder (17) are mounted by clamping, remote from the active blade edge, by means of a heel (17B-1) of blade-retaining blocks or bars (17B) and rubber shims (17G-17H), said shims and a dampening shim (17K) insuring the reduction of contact noise and allowing limited elastic deformation of the free end of the blade.

8. The apparatus according to any one of the preceding claims 1–4 characterized in that the movable support (11, 19, and 21) is positioned against abutments (38, 39), defining its active position, by the effect of gravity, similar to a pendulum.

9. The apparatus according to claim 8 including a sensor and a control system to control the fast moving away of said movable support from the cylinder in case of excessive vibration detected by the sensor.

10. The apparatus according to any one of the preceding claims 1–4 characterized in that in the cylinder (17) between the blades 17E, grooves are formed, each of which has a tooth (17X) which projects from the groove to engage in discharged lumps of web material that may accidentally accumulate therein.

* * * * *